Patented Mar. 31, 1936

2,035,860

UNITED STATES PATENT OFFICE 2,035,860

MANUFACTURE OF RESINS

William B. Borst and Clarence G. Gerhold, Chicago, Ill., assignors to Universal Oil Products Company, Chicago, Ill., a corporation of Delaware No Drawing. Application October 20, 1934, Serial No. 749,274

9 Claims. (Cl. 106—22)

This invention relates more particularly to the manufacture of moldable resins.

In a more specific sense the invention has reference to the manufacture from relatively cheap materials of black resins suitable for various commercial purposes which require material of relatively high resistance to ordinary solvents and chemical reagents, relatively high melting point, and low conductivity for heat or electricity. Examples of uses to which resinous materials of such character are put are the manufacture of switchboards, battery boxes, camera parts, phonograph records, instrument cases, electrical armatures and commutators, telephone receivers, buttons, pipe stems, etc.

The manufacture of the so-called synthetic resins to augment the natural sources of supply which are principally in the saps of plants and trees has been given a great deal of attention for many years on account of the diminishing supply and increasing cost of the natural products. Owing to this intensive development work, many of the artificial resinous materials which have been produced are superior to the naturally occurring substances. They have the added advantage of uniformity and exact reproducibility.

To assist in defining the character of the present invention and indicating the relation of the process and product in the field of synthetic resin manufacture, the following rather inclusive definition of a synthetic resin (which appears in a standard text) is quoted below:

"A synthetic resin is a complex amorphous organic semi-solid or solid material, usually a mixture of substances; built up by chemical reaction and approximating the natural resins in various physical properties; namely, lustre, fracture, comparative brittleness at ordinary temperatures, insolubility in water and fusibility or plasticity when heated or exposed to heat and pressure but commonly deviating widely from natural resins in chemical constitution and behavior with reagents."

From the above it is seen that natural and artificial resins are differentiated principally on a basis of their physical properties and their general reactivities with chemical reagents and not on a basis of their exact chemical constitution, which is nearly always very difficult to determine.

In one specific embodiment the present invention comprises the manufacture of substantially non-fusible black resins by incorporating regulated proportions of wood tar pitches, formaldehyde or formaldehyde yielding materials and finely divided and relatively inert fillers.

The wood tar pitches which it is preferred to use are those remaining as a residue after the distillation of primary hardwood tars and having a melting point of above 200° F. These residues at the present time are generally considered as waste material since they are brittle and tend to swell and intumesce when heated. They have some limited uses in preserving cordage, in paints, roofing, briquette binders, etc. The chemical composition of these pitchy materials can only be a matter of conjective on account of the extremely high molecular weights of their chemical constituents and the fact that the material is obviously a mixture of complex organic compounds containing a high percentage of carbon. It is characteristic of the present invention that the pitches from the distillation of hardwood tars are readily utilizable and generally preferable to those of the distillation of tars from cone-bearing trees such as pine, spruce, hemlock, etc.

The fillers which may be employed in the primary mixes comprise a number of substances such as wood flour, asbestos, mica, cotton, etc. As will be shown by later examples, wood flours are particularly suitable and it may be that they function better than some other fillers on account of their close relationship to the pitches with which they are mixed. The invention is not specially limited, however, to the use of any particular filler or combination of fillers, but may choose materials which are found to yield resins of the most desirable properties when mixed with a given sample of wood tar pitch.

Formaldehyde, although a minor ingredient of the primary mixes which yield resins according to the present process, is nevertheless definitely essential. It may be employed as a concentrated aqueous solution or in compounds which decompose readily to yield it such as, for example, hexamethylenetetramine. The last named compound has a rather complex constitution and may be formed by one method by passing formaldehyde vapor into a concentrated solution of ammonia, evaporating to a syrupy consistency and then pouring into alcohol to effect precipitation. It may also be prepared by the action of ammonia on trioxymethylene and from the interaction of alcoholic ammonia and methylene chloride. A simple commercial method of manufacture consists in dissolving ammonium carbonate in a 40% formaldehyde solution, evaporating to dryness under reduced pressure, sublining the residue under vacuum and recrystallizing from absolute alcohol.

When heated the above compound decomposes into formaldehyde and ammonia to a considerable extent and thus in the present instance yields the small amount of formaldehyde which is found to be essential to the proper setting and consistency of the resinous materials produced, and ammonia which acts catalytically in the resin-forming reactions.

The proportions of the ingredients which are preferred for making resins according to the present invention have considerable latitude although roughly the primary mixes comprise approximately equal parts of wood tar pitch and filler along with from 1 to 5% of formaldehyde as such or in some combination from which it is released on mixing and heating. Obviously the properties of the wood tar pitch will vary according to the wood from which it was primarily produced and the conditions of both primary and secondary distillation such as, for example, the use of steam and vacuum. Similarly when using wood flours as filler (which are not entirely inert in the blends), the final properties of the resins may be affected by the properties of the wood and different proportions of different wood flours may give better results even with the same sample of wood tar pitch. The following table shows the approximate ranges of composition of the primary mixes from which resins are produced.

|  | Parts |
| --- | --- |
| Wood tar pitch | 40–60 |
| Filler | 60–40 |
| Formaldehyde | 0.5–5 |

By using different wood tar pitches, different fillers and various proportions of the ingredients, a series of synthetic resins having different degrees of hardness, fusibility, resiliency, etc., is made possible, and it is to be understood that while certain properties are common to all members of the series, that they are not exactly equivalent.

Resins of the present character are best produced at temperatures above atmospheric, e. g. above 100° F., by the use of hot rolls. Wood tar pitch is melted and maintained at a temperature of approximately 300° F., while stirring in the required amount of filler until the mix is of a solid or a thick pasty consistency. The material is then worked over in heated rolls, and solid material yielding formaldehyde, such as, for example, hexamethylenetetramine is added as a finely divided solid and the kneading continued until a condition of uniformity is obtained. If desired a very small percentage such as 0.1 to 0.5% of some such material as stearic acid may be added to the materials in the rolls to prevent sticking. In normal operation the hot rolling is continued for approximately 20 minutes, after which the product is pulverized to produce the molding powder which can be formed into any desired shape by the use of properly designed and heated molds. It is characteristic of resinous materials of the present character that they possess a certain amount of resiliency which renders them less brittle than many resins having similar properties in other respects and that they are readily machined to make special forms which are difficult to mold.

The following examples are introduced to assist in more closely defining the character and limitations of the present process and its products but these are merely selected cases and are not given with the intention of placing corresponding limits upon the scope of the invention.

*Example I*

Equal parts of a hardwood pitch known in the trade as "jet resin" and having an approximate melting point of 205° F., and pine wood flour were mixed by stirring the wood flour into the melted resin at a temperature of about 300° F., the final mix being of a pitchy consistency. The mix was worked on hot rolls at 350° F., and during the kneading operation 2% by weight of the combined ingredients of hexamethylenetetramine was added in powdered form and the kneading continued for about 20 minutes to insure uniformity in the mix. The solid product from the rolls was cooled and pulverized to form finished molding powder. A small amount (about 0.1%) of stearic acid was added to prevent the resinous materials from sticking to the rolls.

The product was capable of being hot pressed into any desired form and the pressed materials could be readily machined.

*Example II*

In this case the operations were substantially the same as in Example I, but the proportions of the ingredients were varied so that 40 parts by weight of wood tar pitch, 60 parts by weight of wood flour and 2 parts by weight of hexamethylenetetramine were used. The product after the hot rolling and pulverizing had substantially the same properties as the product made according to Example I, but had somewhat greater resiliency owing to the smaller amount of wood tar pitch which it contained.

The nature of the invention and the character of the product obtained by the operation of the process which it discloses are sufficiently evident from the foregoing specification and the example data presented but neither is to be considered as imposing undue limitations on the invention's scope.

We claim as our invention:

1. A process for the manufacture of a synthetic resin which comprises, mixing regulated proportions of a normally solid wood tar pitch, comprising the distillation residue of wood tar, with formaldehyde and working the resulting mixture at a temperature above 100° F.

2. A process for the manufacture of a synthetic resin which comprises, mixing regulated proportions of a normally solid wood tar pitch comprising the distillation residue of wood tar, with formaldehyde and a filling material, and working the resulting mixture at a temperature above 100° F.

3. A process for the manufacture of a synthetic resin which comprises, mixing regulated proportions of a normally solid wood tar pitch, comprising the distillation residue of wood tar, with formaldehyde and a filling material comprising a mineral substance, and working the resulting mixture at a temperature above 100° F.

4. A process for the manufacture of a synthetic resin which comprises, mixing regulated proportions of a normally solid wood tar pitch, comprising the distillation residue of wood tar, with formaldehyde and a filling material comprising a fibrous substance, and working the resulting mixture at a temperature above 100° F.

5. A process for the manufacture of a synthetic resin which comprises, mixing regulated proportions of a normally solid wood tar pitch, comprising the distillation residue of wood tar, with formaldehyde and a filling material comprising wood flour, and working the resulting mixture at a temperature above 100° F.

6. A process for producing synthetic resin which comprises mixing a wood tar pitch, having a melting point above 200° F., with formaldehyde and working the resultant mixture at a temperature above the melting point of the pitch.

7. A process for producing synthetic resin which comprises mixing a wood tar pitch, having a melting point above 200° F., with formaldehyde and a filler and working the resultant mixture at a temperature above the melting point of the pitch.

8. A synthetic resin comprising the condensation product of a normally solid wood tar pitch, comprising the distillation residue of wood tar, with formaldehyde.

9. A synthetic resin comprising the condensation product of a wood tar pitch, having a melting point above 200° F., with formaldehyde.

WILLIAM B. BORST.
CLARENCE G. GERHOLD.